(12) United States Patent
Fahrenthold et al.

(10) Patent No.: US 8,630,390 B2
(45) Date of Patent: Jan. 14, 2014

(54) AUTOMATED E911 ROUTE VERIFICATION

(75) Inventors: Kyle Fahrenthold, Princeton, TX (US);
Casimer Kaczmarczyk, Plano, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 1507 days.

(21) Appl. No.: 11/954,062

(22) Filed: Dec. 11, 2007

(65) Prior Publication Data

US 2009/0147926 A1    Jun. 11, 2009

(51) Int. Cl.
*H04M 1/24* (2006.01)

(52) U.S. Cl.
USPC .......... 379/10.02; 379/10.03; 379/37

(58) Field of Classification Search
USPC ............................. 379/37–51, 1–35
See application file for complete search history.

(56) References Cited

U.S. PATENT DOCUMENTS

| | | | | |
|---|---|---|---|---|
| 5,502,756 A | * | 3/1996 | Crocker et al. | 379/27.02 |
| 6,690,923 B1 | * | 2/2004 | Ortiz Perez et al. | 455/74.1 |
| 7,388,946 B1 | * | 6/2008 | Mussman et al. | 379/15.01 |
| 8,032,109 B1 | * | 10/2011 | Ho et al. | 455/404.1 |
| 2004/0237116 A1 | * | 11/2004 | Allen | 725/121 |
| 2009/0052633 A1 | * | 2/2009 | Croak et al. | 379/37 |

OTHER PUBLICATIONS

National Emergency No. Association (NENA), "Interim VoIP Architecture for Enhanced 9-1-1 Services (i2)", Issue 1, Dec. 6, 2005, 181 pages.
Federal Communications Commission, "The National Emergency Network", http://www.fcc.gov/pshs/911/Welcome.html, Aug. 16, 2007, 2 pages.
Federal Communications Commission, "E911 Requirements for IP-Enabled Service Providers", Jun. 3, 2005, 90 pages.

* cited by examiner

*Primary Examiner* — Duc Nguyen
*Assistant Examiner* — Iyosef K. Laekemariam (57) ABSTRACT

A device simulates an emergency services test call based on an automatic number identification (ANI) to be tested, and generates a test notification associated with the emergency services test call. The device also automatically initiates the emergency services test call, receives results of the emergency services test call, and generates an emergency services call information report based on the results of the emergency services test call.

22 Claims, 10 Drawing Sheets

AUTOMATED E911 ROUTE VERIFICATION

BACKGROUND

Enhanced 911 (or E911) service is a feature of the 911 emergency-calling system that automatically associates a physical address with a calling party's Automatic Number Identification (ANI). The enhanced 911 service provides emergency responders with the location of the emergency without the calling party having to provide it. A final destination of a 911 call (e.g., where the 911 operator is located) is referred to as a Public Safety Answering Point (PSAP). A calling party number (CPN) may be used to determine the ANI associated with the calling party. The ANI may be used to look up an address of the calling party, associated with the ANI, in a third party Automatic Location Identification (ALI) database that is secure and separate from the public telephone network. The determined address of the calling party may be used to locate the closest PSAP to the calling party in the emergency situation. The PSAP may receive emergency (or 911) calls and associated address information, and may respond to the emergency accordingly.

In 2005, the Federal Communications Commission imposed obligations on voice over Internet Protocol (VoIP) service providers (VSP) to enable E911 services to their VoIP subscribers. As a result, VoIP subscribers must register their locations with the VSP for storage in regional ALI databases. Now, when a VoIP subscriber makes a 911 call, the VSP (or a positioning server) and the PSAP can query the regional ALI databases to assist in accurate PSAP termination and to provide an emergency operator with the VoIP subscriber's location and callback number. Such an emergency calling scenario is simplistic, and several complexities can be introduced into the scenario. For example, the VoIP subscriber may become mobile, and/or the VSP may not have the resources to route the emergency call to the proper PSAP and may utilize another VSP's network to complete the emergency call. There may be numerous factors that can cause route failures or inaccurate location identification being provided to the PSAP.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Exhaustive testing may be required by each VSP to validate all possible E911 call scenarios and to assure their customers that they can be provided with the best possible emergency services. The growth of VoIP has created many challenges, but E911 implementation and routing verification has become one of the most difficult challenges. Currently, E911 call route verification is manually executed via test calls to live E911 operators. Such a manual method is not only cumbersome and labor intensive, but also ties up precious human resources in the E911 PSAP.

Implementations described herein may include systems and/or methods that automatically test, verify, and/or validate E911 call scenarios by originating the E911 call, answering the E911 call, identifying a location associated with the E911 call, and/or performing a callback function. For example, in one implementation, the systems and/or methods may simulate an E911 test call based on an ANI to be tested, may generate a test notification, and may automatically initiate the E911 test call. The systems and/or methods may query an ALI database based on the ANI associated with the E911 test call, and may retrieve ANI information from the ALI database based on the query. The systems and/or methods may generate a call information report based on the ANI information and the other E911 test results, may validate callback connectivity, and may append callback validation information to the call information report.

As used herein, the terms "customer," "caller," "calling party," and/or "user" may be used interchangeably. Also, the terms "customer," "caller," "calling party," and/or "user" are intended to be broadly interpreted to include a user device and/or an AERVS or a user of a user device and/or an AERVS.

Figure 1:
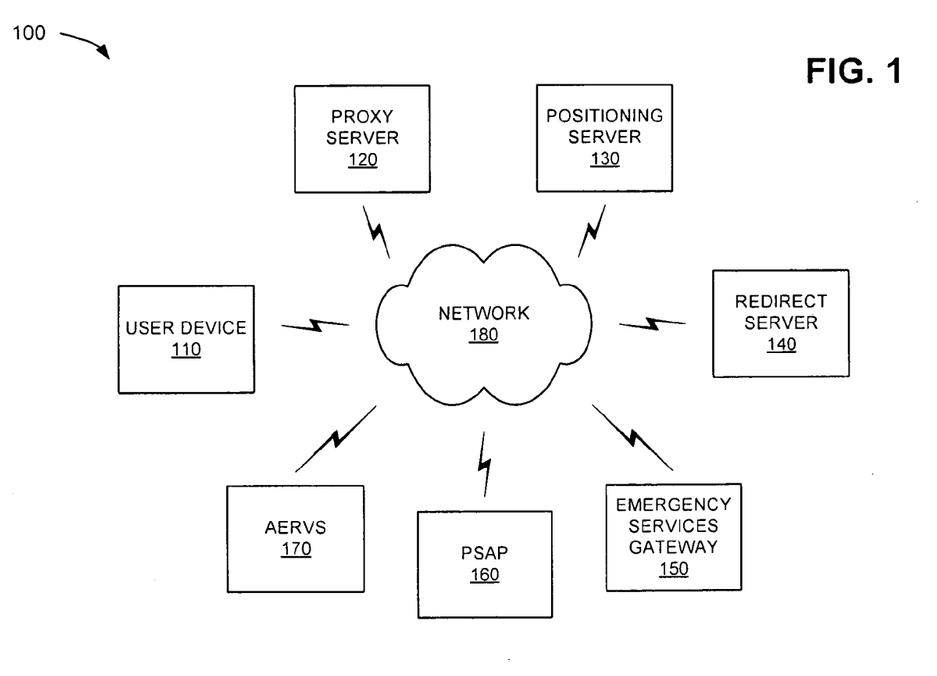
FIG. 1 is an exemplary diagram of a network in which systems and methods described herein may be implemented.

FIG. 1 is an exemplary diagram of a network 100 in which systems and methods described herein may be implemented. As illustrated, network 100 may include a user device 110, a proxy server 120, a positioning server 130, a redirect server 140, an emergency services gateway 150, a public safety answering point (PSAP) 160, and/or an automated E911 route verification system (AERVS) 170 interconnected by a network 180. User device 110, proxy server 120, positioning server 130, redirect server 140, emergency services gateway 150, PSAP 160, and/or AERVS 170 may connect to network 180 via wired and/or wireless connections. A single user device, proxy server, positioning server, redirect server, emergency services gateway, PSAP, AERVS, and network have been illustrated in FIG. 1 for simplicity. In practice, there may be more or less user devices, proxy servers, positioning servers, redirect servers, emergency services gateways, PSAPs, AERVSs, and/or networks. Also, in some instances, one or more of user device 110, proxy server 120, positioning server 130, redirect server 140, emergency services gateway 150, PSAP 160, and/or AERVS 170 may perform one or more functions described as being performed by another one or more of user device 110, proxy server 120, positioning server 130, redirect server 140, emergency services gateway 150, PSAP 160, and/or AERVS 170.

User device 110 may include a Plain Old Telephone Service (POTS) telephone, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, a VoIP-based device, or other types of computation or communication devices, threads or processes running on these devices, and/or objects executable by these devices. In one implementation, user device 110 may include any device that is capable of initiating an E911 call.

Proxy server 120 may include one or more server entities, or other types of computation or communication devices, that gather, process, search, and/or provide information in a manner described herein. In one implementation, proxy server 120 may include a server (e.g., a computer system or an application) capable of servicing client requests by forwarding the requests to other servers. For example, proxy server 120 may receive an E911 call from user device 110 and may query a server (e.g., redirect server 140) for route information (e.g., relating to routing the E911 call throughout network 100) associated with E911 call.

Positioning server 130 may include one or more server entities, or other types of computation or communication devices, that gather, process, search, and/or provide information in a manner described herein. In one implementation, positioning server 130 may include a server capable of providing a gateway between a mobile network and location-dependent applications. For example, positioning server 130 may receive a query (e.g., from proxy server 120) for route information, may query an ALI database for the route information, and may provide the received route information to proxy server 120.

Redirect server 140 may include one or more server entities, or other types of computation or communication devices, that gather, process, search, and/or provide information in a manner described herein. In one implementation, redirect server 140 may include a server capable of providing route information in response to a request from a client. For example, redirect server 140 may receive a query (e.g., from proxy server 140) for route information, may retrieve route information (if available), and may provide the retrieved route information to proxy server 120.

Emergency services gateway 150 may include a data transfer device, such as a gateway, a router, a switch, a firewall, a bridge, a proxy server, a server, a device providing domestic switching capabilities, or some other type of device that processes and/or transfers data. In one implementation, emergency services gateway may operate on data on behalf of a network (e.g., network 180) and may serve as an entrance to another network (e.g., an emergency services network of multiple PSAPs).

PSAP 160 may include one or more entities that are responsible for answering emergency (or 911) calls for emergency assistance from police, fire, and ambulance services. PSAP 160 may include one or more user devices, network devices, and/or other communication devices that service emergency calls. In one implementation, PSAP 160 may receive emergency calls from network 180 via Multi-Frequency (MF) trunks, digital trunks, ISDN User Part (ISUP) trunks controlled by the SS7 protocol, basic 911 trunks, E911 trunks, etc. In another implementation, PSAP 160 may communicate with emergency personnel (e.g., police, fire, and/or ambulance services) (not shown) to provide information associated with emergency calls.

AERVS 170 may include one or more devices capable of automatically testing, verifying (e.g., verifying an ANI against the ALI database), and/or validating E911 call scenarios by originating the E911 call, answering the E911 call, identifying a location associated with the E911 call, and/or performing a callback function (e.g., eliminating a need for PSAP operator assistance). In one implementation, AERVS 170 may assist with test demands that provide a higher degree of uninterrupted emergency services with regard to VoIP and wireless (e.g., Global System for Mobile Communications (GSM) and Code Division Multiple Access (CDMA)) networks where subscriber mobility is possible. In other implementations AERVS 170 may support verification paths and/or processes associated with providing emergency services for the disabled or handicapped individuals (e.g., a teletypewriter (TTY), instant messaging, video sign language, etc.). Further details of AERVS 170 are provided below in connection with FIGS. 4-6.

Network 180 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network (e.g., wireless GSM, wireless CDMA, etc.), any network supporting emergency (E911) services (e.g., a VoIP network with mobile and/or fixed locations, a wireline network, etc.), or a combination of networks.

Figure 2:
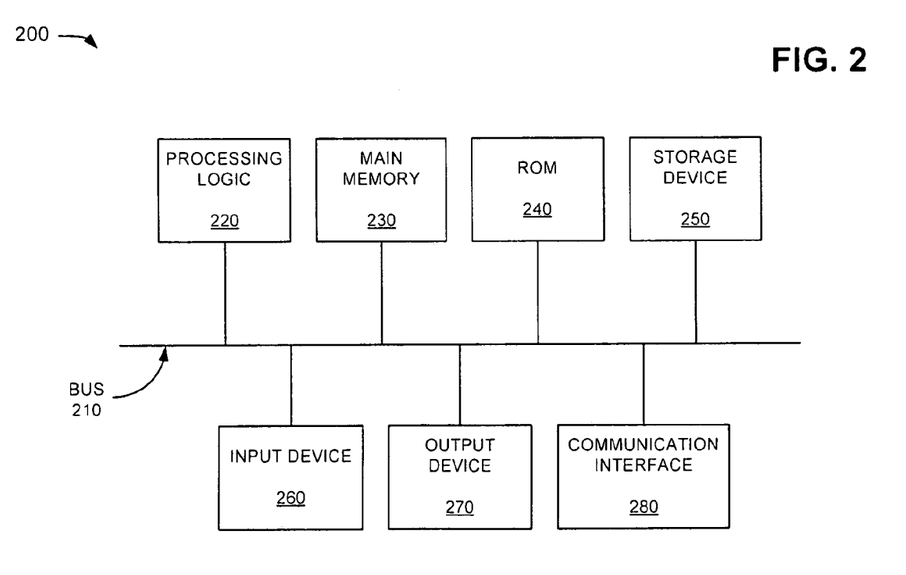
FIG. 2 illustrates exemplary components of a user device, a proxy server, a positioning server, a redirect server, an emergency services gateway, a public safety answering point (PSAP), and/or an automated E911 route verification system (AERVS) of the network depicted in FIG. 1.

FIG. 2 is an exemplary diagram of a device 200 that may correspond to any of user device 110, proxy server 120, positioning server 130, redirect server 140, emergency services gateway 150, PSAP 160, and/or AERVS 170. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 170.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
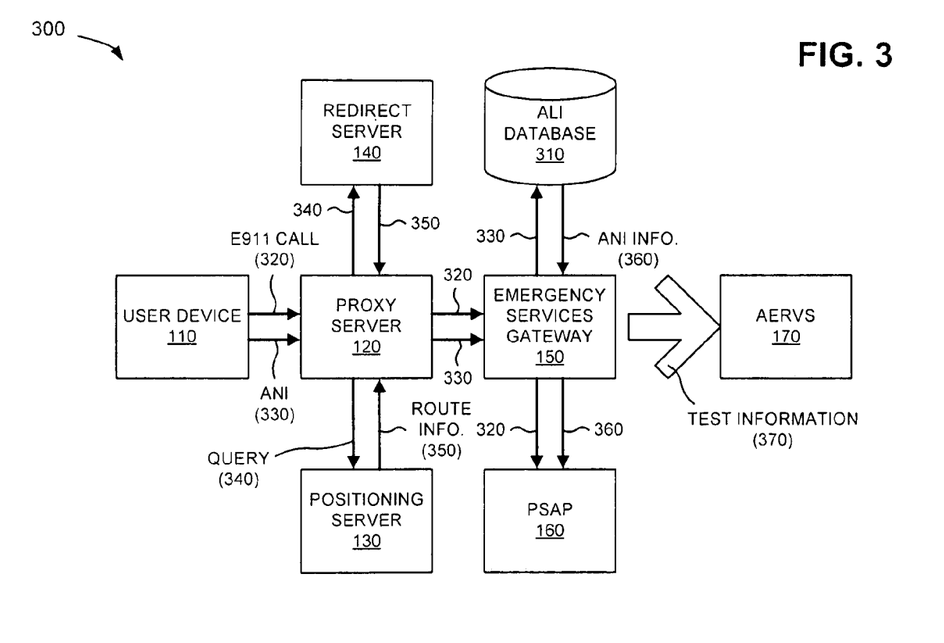
FIG. 3 depicts a diagram of a portion of the network depicted in FIG. 1, and exemplary interactions between components of the network during an E911 call.

FIG. 3 depicts a diagram of a portion 300 of network 100, and exemplary interactions between components of network 100 during an E911 call. As illustrated, network portion 300 may include user device 110, proxy server 120, positioning server 130, redirect server 140, emergency services gateway 150, PSAP 160, and AERVS 170, as described above in connection with FIG. 1. Network portion 300 may also include an ALI database 310. ALI database 310 may include one or more databases that map calling phone numbers (CPNs) or ANIs to an addresses and emergency service numbers (ESNs) (e.g., ANI information).

As further shown in FIG. 3, user device 110 may initiate an emergency (E911) call 320 associated with an ANI 330, and proxy server 120 may be receive E911 call 320 and ANI 330. Proxy server 120 may generate a query 340 (e.g., based on E911 call 320 and/or ANI 330) for route information 350 (e.g., information regarding where to route E911 call 320), and may provide query 340 to redirect server 140. Redirect server 140 may receive query 340, and may determine if it has some or all of the requested route information 350. If redirect server 140 has some or all of the route information 350, it may provide some or all of route information 350 to proxy server 120. Proxy server 120 may determine if route information 350 is sufficient to route E911 call 320. If route information is insufficient to route E911 call 320, proxy server 120 may send query 340 to positioning server 130 for additional route information 350. Positioning server 130 may query ALI database 310 for the additional route information 350, and may provide the additional route information 350 to proxy server 120. If positioning server 130 is unable to obtain the additional route information 350, proxy server 120 may query redirect server 140 for default route information (e.g., information defining a default route for routing E911 calls when route information is insufficient).

If proxy server 120 has sufficient route information 350, proxy server 120 may route E911 call 320 and ANI 330 to an appropriate emergency services gateway (e.g., emergency services gateway 150) based on route information 350. Emergency services gateway 150 may provide ANI 330 to a third party ALI database (e.g., ALI database 310) in order to determine ANI information 360 (e.g., address and/or location information associated with user device 110). ANI information 360 may be used by emergency services gateway 150 to determine a location of the closest PSAP (e.g., PSAP 160) to user device 110 so that E911 call 320 may be delivered to the closest PSAP. Emergency services gateway 150 may complete the call by forwarding E911 call 320 and ANI information 360 of user device 110 to PSAP 160. PSAP 160 may, in turn, provide the appropriate emergency services in a timely and efficient manner to the user of user device 110.

As further shown in FIG. 3, the interactions depicted by network portion 300 may be tested by AERVS 170, and AERVS 170 may receive test information 370 based on the tested interactions. Further details of test information 370 and an emergency services test scenario are provided below in connection with FIG. 4.

Although FIG. 3 shows exemplary components of network portion 300, in other implementations, network portion 300 may contain fewer, different, or additional components than depicted in FIG. 3. In still other implementations, one or more components of network portion 300 may perform one or more other tasks described as being performed by one or more other components of network portion 300.

Figure 4:
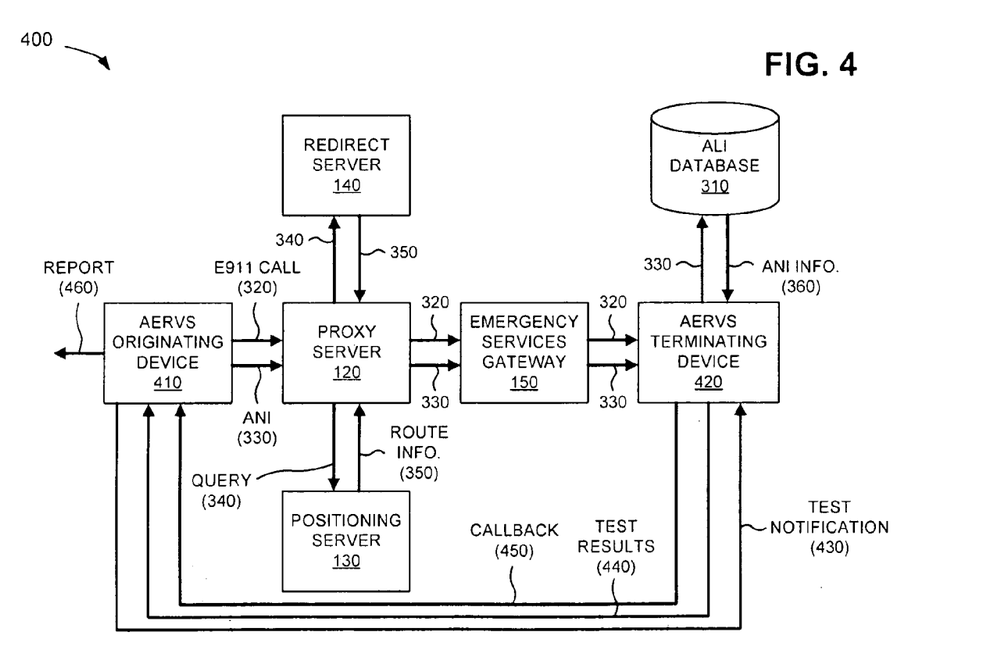
FIG. 4 depicts a diagram of a portion of the network depicted in FIG. 1, and exemplary interactions between components of the network during an emergency services test scenario.

FIG. 4 depicts a diagram of a portion 400 of network 100, and exemplary interactions between components of network 100 during an emergency services test scenario. As illustrated, network portion 400 may include proxy server 120, positioning server 130, redirect server 140, emergency services gateway 150, PSAP 160, and ALI database 310, as described above in connection with FIGS. 1 and 3. As further illustrated, AERVS 170 may be divided into an AERVS originating device 410 and an AERVS terminating device 420. In one implementation, AERVS originating device 410 and AERVS terminating device 420 may be two separate, distinct devices capable of communicating with each other. In other implementations, AERVS originating device 410 and AERVS terminating device 420 may be combined into a single device.

AERVS originating device 410 may include a device (e.g., device 200), such as a laptop, a personal computer, or other types of computation or communication devices, threads or processes running on these devices, and/or objects executable by these devices. In one implementation, AERVS originating device 410 may include a device capable of originating a simulated E911 call (e.g., E911 call 320, which may be referred to as "simulated E911 call 320" in this scenario) based on an ANI (e.g., ANI 320, which may be referred to as "test ANI 320" in this scenario). Further details of AERVS originating device 410 are provided below in connection with FIG. 5.

AERVS terminating device 420 may include a device (e.g., device 200), such as a laptop, a personal computer, or other types of computation or communication devices, threads or processes running on these devices, and/or objects executable by these devices. In one implementation, AERVS terminating device 420 may include a device capable of terminating simulated E911 call 320 based on test ANI 320, and providing test results associated with the test scenario to AERVS originating device 410. Further details of AERVS terminating device 420 are provided below in connection with FIG. 6.

As further shown in FIG. 4, AERVS originating device 410 may generate simulated E911 call 320 based on test ANI 330, and may provide a test notification 430 to AERVS terminating device 420 if the test is ready to commence. Test notification 430 may inform AERVS terminating device 420 that AERVS originating device 410 will be sending simulated E911 call 320 at a specified time (e.g., temporal information associated with simulated E911 call 320). AERVS originating device 410 may initiate simulated E911 call 320 associated with test ANI 330, and proxy server 120 may receive simulated E911 call and test ANI 330. Proxy server 120 may generate query 340 (e.g., based on simulated E911 call 320 and/or test ANI 330) for route information 350 (e.g., information regarding where to route simulated E911 call 320), and may provide query 340 to redirect server 140.

Redirect server 140 may receive query 340, and may determine if it has some or all of the requested route information 350. If redirect server 140 has some or all of the route information 350, it may provide some or all of route information 350 to proxy server 120. Proxy server 120 may determine if route information 350 is sufficient to route simulated E911 call 320. If route information is insufficient to route simulated E911 call 320, proxy server 120 may send query 340 to positioning server 130 for additional route information 350. Positioning server 130 may query ALI database 310 for the additional route information 350, and may provide the additional route information 350 to proxy server 120. If positioning server 130 is unable to obtain the additional route information 350, proxy server 120 may query redirect server 140 for default route information (e.g., information defining a default route for routing E911 calls when route information is unavailable).

If proxy server 120 has sufficient route information 350, proxy server 120 may route simulated E911 call 320 and test ANI 330 to an appropriate emergency services gateway (e.g., emergency services gateway 150) based on route information 350. Emergency services gateway 150 may route simulated E911 call 320 and test ANI 330 to AERVS terminating device 420. If AERVS terminating device 420 does not answer simulated E911 call 320, failure results (e.g., indicating that simulated E911 call 320 failed to complete) may be sent to AERVS originating device 410. If AERVS terminating device 420 answers simulated E911 call 320 (e.g., and receives test ANI 330), AERVS terminating device 420 may provide test ANI 330 to a third party ALI database (e.g., ALI database 310) in order to determine ANI information 360 (e.g., address and/or location information associated with test ANI 330). If ALI database 310 fails to provide ANI information 360 to AERVS terminating device 420, AERVS terminating device 420 may provide failure results (e.g., failed to retrieve ANI information 360) to AERVS originating device 410. If failure results are received by AERVS originating device 410, AERVS originating device 410 may terminate the failed E911 call 320, may compile failed call data, and may generate (and/or store) the compiled failed call data in a report 460.

If ALI database 310 provides ANI information 360 to AERVS terminating device 420, AERVS terminating device 420 may compile ANI information 360, and may send test results 440 to AERVS originating device 410. AERVS originating device 410 may terminate simulated E911 call 320, may compile passed call data (e.g., test results 440), and may generate (and/or store) the compiled passed call data in report 460.

Test results 440 may include any of the failure results discussed above, the compiled ANI information 360, and information associated with a variety of tests (e.g., whether simulated E911 call 320 routes to a correct PSAP based on test ANI 330; a voice path and/or voice quality of simulated E911 call 320; whether hearing impaired support (i.e., TTY, instant messaging, video sign language, etc.) is provided for simulated E911 call 320; whether ANI information 360 is accurate; whether a callback number (e.g., to AERVS originating device 410) may be reached; whether a location for mobile users may be identified; etc.).

Report 460 may include any information associated with test results 440. For example, report 460 may include information associated with the failure results, the compiled ANI information 360, whether simulated E911 call 320 routes to a correct PSAP based on test ANI 330, a voice path and/or voice quality of simulated E911 call 320, whether hearing impaired support (i.e., TTY, instant messaging, video sign language, etc.) is provided for simulated E911 call 320, whether ANI information 360 is accurate; whether a callback number (e.g., to AERVS originating device 410) may be reached, whether a location for mobile users may be identified, etc. In other implementations, report 460 may include one or more reports that include any information associated with test results 440.

As further shown in FIG. 4, AERVS terminating device 420 may place a callback call 450 to a callback number provided during simulated E911 call 320. If AERVS originating device 410 fails to receive callback 450, AERVS terminating device 420 may disconnect callback 450 and may send callback error information to AERVS originating device 410. AERVS originating device 410 may append the callback error information to report 460, and may generate (and/or store) report 460 with the appended information. If AERVS originating device 410 receives callback 450, AERVS originating device 410 may validate connectivity with AERVS terminating device 420, and AERVS terminating device 420 may disconnect callback call 450. AERVS originating device 410 may append passed callback information to report 460, and may generate (and/or store) report 460 with the appended information.

Although FIG. 4 shows exemplary components of network portion 400, in other implementations, network portion 400 may contain fewer, different, or additional components than depicted in FIG. 4. In still other implementations, one or more components of network portion 400 may perform one or more other tasks described as being performed by one or more other components of network portion 400.

Figure 5:
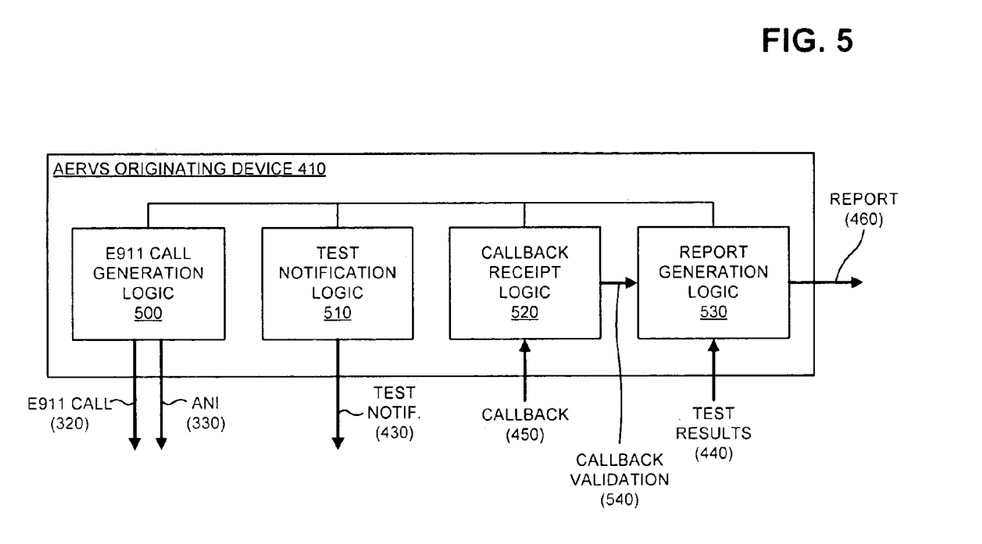
FIG. 5 illustrates an exemplary functional block diagram of an AERVS originating device provided in the AERVS of the network depicted in FIG. 1.

FIG. 5 illustrates an exemplary functional block diagram of AERVS originating device 410. As illustrated, AERVS originating device 410 may include E911 call generation logic 500, test notification logic 510, callback receipt logic 520, and report generation logic 530. The functions described in FIG. 5 may be performed by one or more of the exemplary components of device 200 depicted in FIG. 2.

E911 call generation logic 500 may include any hardware and/or software based logic (e.g., processing logic 220) that may enable AERVS originating device 410 to provide simulated E911 call 320 and test ANI 330 for testing a network supporting emergency services. In one example, E911 call generation logic 500 may receive an ANI to be tested (e.g., from a user, via input device 260), and may create simulated E911 call 320 and test ANI 330 based on the received information. E911 call generation logic 500 may provide simulated E911 call 320 and ANI 330 to a network to be tested.

Test notification logic 510 may include any hardware and/or software based logic (e.g., processing logic 220) that may enable AERVS originating device 410 to provide test notification 430 to AERVS terminating device 420. In one example, test notification logic 510 may provide test notification 430 that informs AERVS terminating device 420 that AERVS originating device 410 will be sending simulated E911 call 320 at a specified time (e.g., temporal information associated with simulated E911 call 320).

Call receipt logic 520 may include any hardware and/or software based logic (e.g., processing logic 220) that may enable AERVS originating device 410 to receive a callback from AERVS terminating device 420. In one example, call receipt logic 520 may receive callback 450 (or callback error information if callback 450 fails), may validate connectivity with AERVS terminating device 420, and may provide callback validation 540 (e.g., passed callback information or callback error information) to report generation logic 530.

Report generation logic 530 may include any hardware and/or software based logic (e.g., processing logic 220) that may enable AERVS originating device 410 to generate report 460. In one example, report generation logic 530 may receive test results 440 from AERVS terminating device 420, may receive callback validation 540 from callback receipt logic 520, may compile test results 440, and may generate (and/or store) the compiled test results 440 in report 460. Report generation logic 530 may append passed callback information or callback error information to report 460, and may generate (and/or store) report 460 with the appended information. Report 460 may be provided to a user (e.g., a tester of a network supporting emergency services) of AERVS 170.

Although FIG. 5 shows exemplary functional components of AERVS originating device 410, in other implementations, AERVS originating device 410 may contain fewer, different, or additional functional components than depicted in FIG. 5. In still other implementations, one or more functional components of AERVS originating device 410 may perform one or more other tasks described as being performed by one or more other functional components of AERVS originating device 410.

Figure 6:
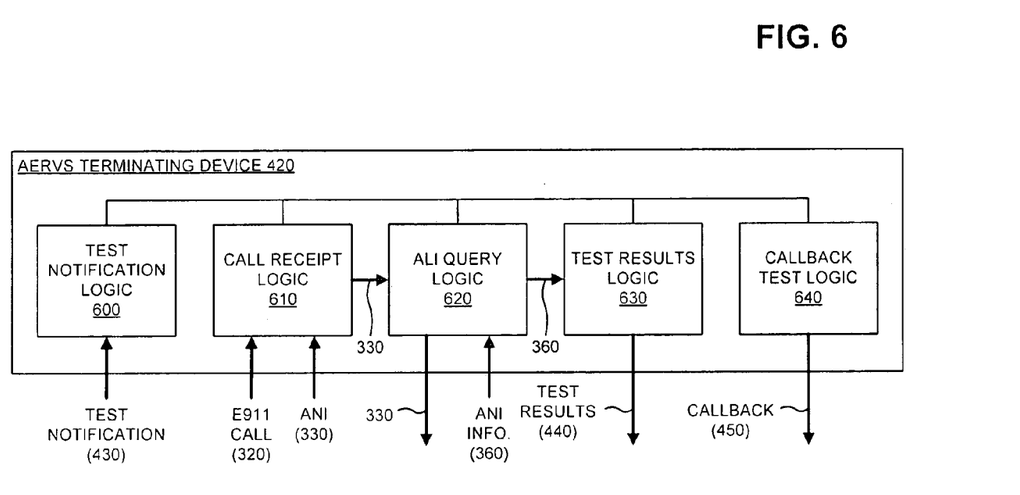
FIG. 6 depicts an exemplary functional block diagram of an AERVS terminating device provided in the AERVS of the network depicted in FIG. 1.

FIG. 6 illustrates an exemplary functional block diagram of AERVS terminating device 420. As illustrated, AERVS terminating device 420 may include test notification logic 600, call receipt logic 610, ALI query logic 620, test results logic 630, and callback test logic 640. The functions described in FIG. 6 may be performed by one or more of the exemplary components of device 200 depicted in FIG. 2.

Test notification logic 600 may include any hardware and/or software based logic (e.g., processing logic 220) that enables AERVS terminating device 420 to receive test notification 430 from AERVS originating device 410. In one example, test notification logic 600 (e.g., via test notification 430) may inform AERVS terminating device 420 that AERVS originating device 410 will be sending simulated E911 call 320 at a specified time (e.g., temporal information associated with simulated E911 call 320).

Call receipt logic 610 may include any hardware and/or software based logic (e.g., processing logic 220) that enables AERVS terminating device 420 to receive simulated E911 call 320 and test ANI 330 from AERVS originating device 410. In one example, call receipt logic 610 may receive simulated E911 call 320 and test ANI 330, and may provide test ANI 330 to ALI query logic 620.

ALI query logic 620 may include any hardware and/or software based logic (e.g., processing logic 220) that enables AERVS terminating device 420 to determine ANI information 360 (e.g., address and/or location information associated with test ANI 330). In one example, ALI query logic 620 may receive test ANI 330, and may provide test ANI 330 to a third party ALI database (e.g., ALI database 310) in order to determine ANI information 360. If ALI database 310 fails to provide ANI information 360 to ALI query logic 620, test results logic 630 may provide failure results (e.g., failed to retrieve ANI information 360) to AERVS originating device 410. ALI query logic 620 may provide ANI information 360 (or error information if ANI information 360 is not retrieved) to test results logic 630.

Test results logic 630 may include any hardware and/or software based logic (e.g., processing logic 220) that enables AERVS terminating device 420 to generate test results 440. In one example, test results logic 630 may receive ANI information 360 (or error information if ANI information 360 is not retrieved) from ALI query logic 620, may compile ANI information 360, and may send test results 440 to AERVS originating device 410.

Callback test logic 640 may include any hardware and/or software based logic (e.g., processing logic 220) that enables AERVS terminating device 420 to perform callback validation. In one example, callback test logic 640 may place callback 450 to a callback number provided during simulated E911 call 320. If AERVS originating device 410 fails to receive callback 450, callback test logic 640 may disconnect callback 450 and may send callback error information to AERVS originating device 410.

Although FIG. 6 shows exemplary functional components of AERVS terminating device 420, in other implementations, AERVS terminating device 420 may contain fewer, different, or additional functional components than depicted in FIG. 6. In still other implementations, one or more functional components of AERVS terminating device 420 may perform one or more other tasks described as being performed by one or more other functional components of AERVS terminating device 420.

Figure 7:
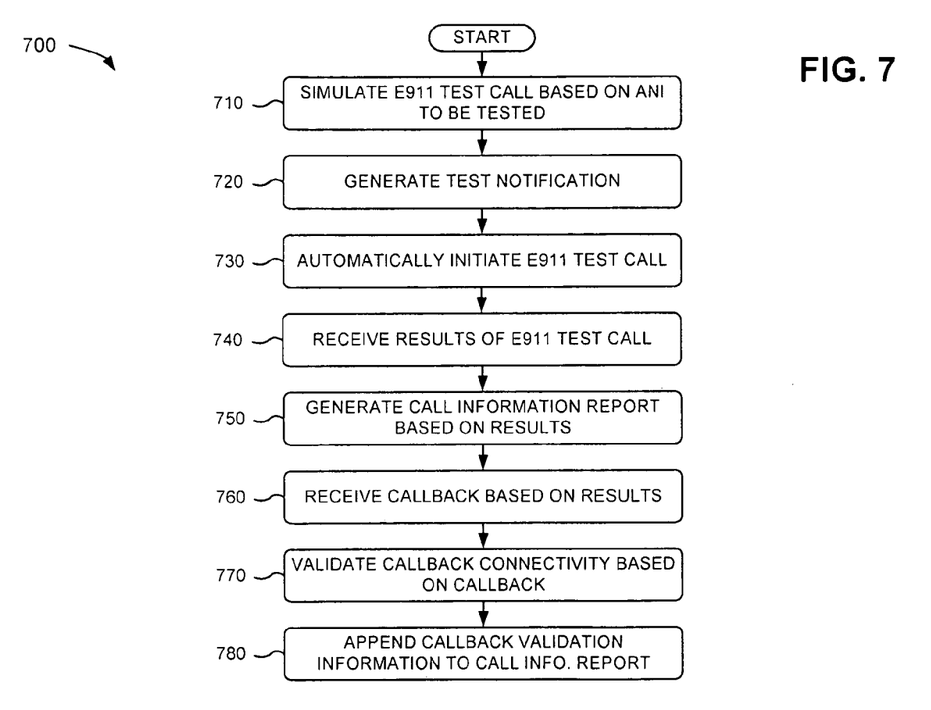
FIGS. 7-10 depict flow charts of exemplary processes according to implementations described herein.
Figure 8:
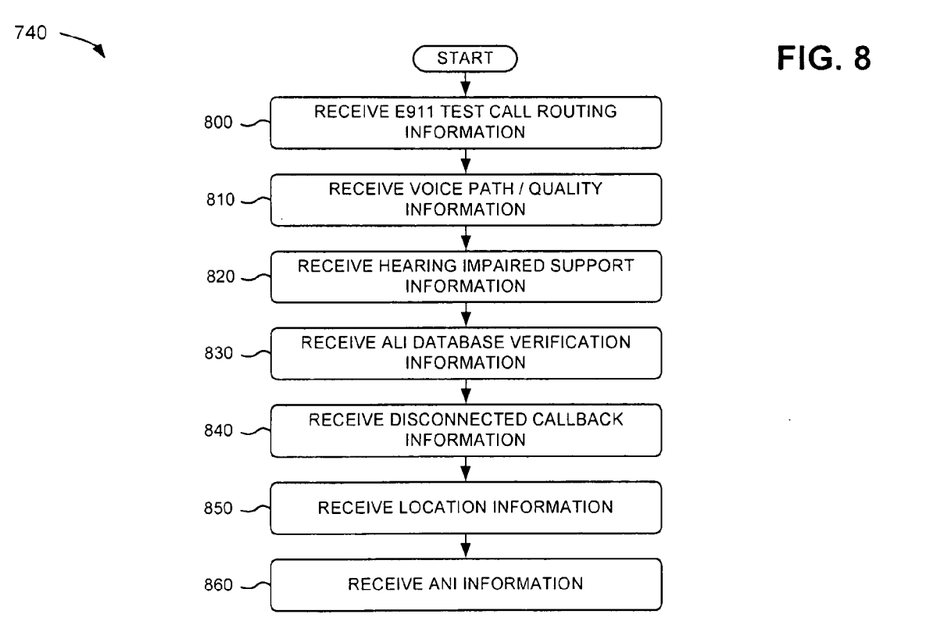

FIGS. 7 and 8 depict a flow chart of an exemplary process 700 for automatically testing, verifying, and/or validating a network supporting emergency services, according to implementations described herein. In one implementation, process 700 may be performed by AERVS originating device 410. In another implementation, some or all of process 700 may be performed by another device or group of devices, including or excluding AERVS originating device 410.

As illustrated in FIG. 7, process 700 may begin with simulation of an emergency services (E911) test call based on an ANI to be tested (block 710), and generation of a corresponding test notification (block 720). For example, in implementations described above in connection with FIG. 5, E911 call generation logic 500 of AERVS originating device 410 may receive an ANI to be tested (e.g., from a user, via input device 260), and may create simulated E911 call 320 and test ANI 330 based on the received information. Test notification logic 510 of AERVS originating device 410 may provide test notification 430 that informs AERVS terminating device 420 that AERVS originating device 410 will be sending simulated E911 call 320 at a specified time (e.g., temporal information associated with simulated E911 call 320).

As further shown in FIG. 7, the E911 test call may be automatically initiated (block 730), one or more results of the E911 test call may be received (block 740), and a call information report may be generated based on the one or more results (block 750). For example, in implementations described above in connection with FIG. 5, E911 call generation logic 500 of AERVS originating device 410 may provide simulated E911 call 320 and ANI 330 to a network to be tested. Report generation logic 530 of AERVS originating device 410 may receive test results 440 from AERVS terminating device 420, may compile test results 440, and may generate (and/or store) the compiled test results 440 in report 460. Report generation logic 530 may generate (and/or store) report 460. Report 460 may be provided to a user (e.g., a tester of a network supporting emergency services) of AERVS 170.

Returning to FIG. 7, a callback may be received based on the results (block 760), callback connectivity may be validated based on the callback (block 770), and callback validation information may be appended to the call information report (block 780). For example, in implementations described above in connection with FIG. 5, call receipt logic 520 of AERVS originating device 410 may receive callback 450 (or callback error information if callback 450 fails), may validate connectivity with AERVS terminating device 420, and may provide callback validation 540 (e.g., passed callback information or callback error information) to report generation logic 530. Report generation logic 530 may receive callback validation 540 from callback receipt logic 520, may append passed callback information or callback error information to report 460, and may generate (and/or store) report 460 with the appended information.

Process block 740 may include the process blocks illustrated in FIG. 8. As shown in FIG. 8, process block 740 may include one or more of receiving E911 test call routing information (block 800), receiving voice path and/or voice quality information (block 810), receiving hearing impaired support information (block 820), receiving ALI database verification information (block 830), receiving disconnected callback information (block 840), receiving location information (block 850), and/or receiving ANI information (block 860). For example, in implementations described above in connection with FIG. 4, AERVS originating device 410 may receive test results 440 from AERVS terminating device 420. Test results 440 may include any of the failure results discussed above, the compiled ANI information 360, and information associated with a variety of tests (e.g., whether simulated E911 call 320 routes to a correct PSAP based on test ANI 330; a voice path and/or voice quality of simulated E911 call 320; whether hearing impaired support (i.e., TTY, instant messaging, video sign language, etc.) is provided for simulated E911 call 320; whether ANI information 360 is accurate; whether a callback number (e.g., to AERVS originating device 410) may be reached; whether a location for mobile users may be identified; etc.).

Figure 9:
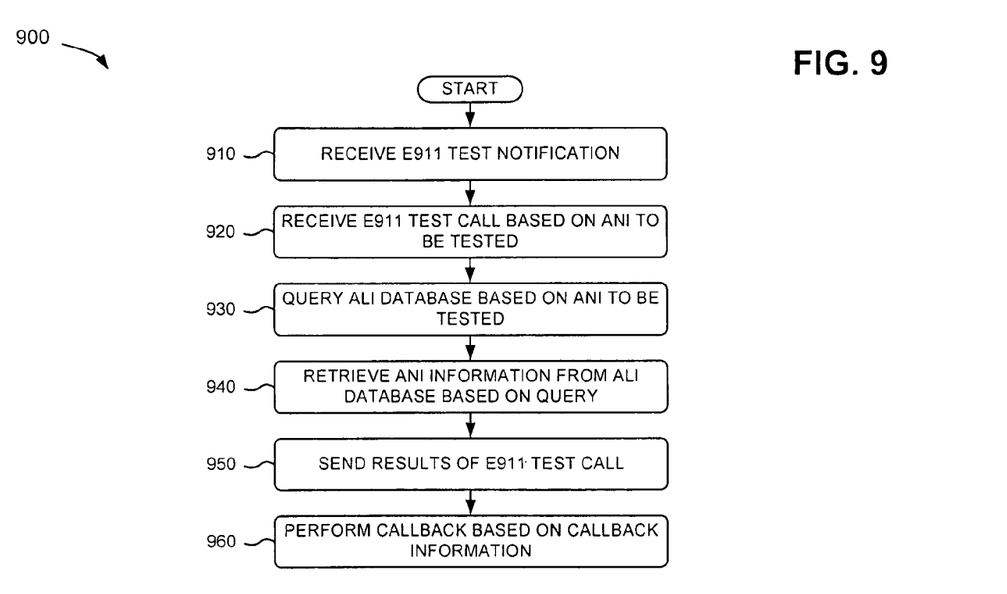

FIG. 9 depicts a flow chart of an exemplary process 900 for automatically testing, verifying, and/or validating a network supporting emergency services, according to implementations described herein. In one implementation, process 900 may be performed by AERVS terminating device 420. In another implementation, some or all of process 900 may be performed by another device or group of devices, including or excluding AERVS terminating device 420.

As illustrated in FIG. 9, process 900 may begin with receipt of an emergency services (E911) test notification (block 910), and receipt of an emergency services (E911) test call based on an ANI to be tested (block 920). For example, in implementations described above in connection with FIG. 6, test notification logic 600 of AERVS terminating device 420 may receive test notification 430 from AERVS originating device 410, which may inform AERVS terminating device 420 that AERVS originating device 410 will be sending simulated E911 call 320 at a specified time (e.g., temporal information associated with simulated E911 call 320). Call receipt logic 610 of AERVS terminating device 420 may receive simulated E911 call 320 and test ANI 330 from AERVS originating device 410.

As further shown in FIG. 9, an ALI database may be queried based on the ANI to be tested (block 930), and ANI information may be retrieved from the ALI database based on the query (block 940). For example, in implementations described above in connection with FIG. 6, ALI query logic 620 of AERVS terminating device 420 may receive test ANI 330, and may provide test ANI 330 to a third party ALI database (e.g., ALI database 310) in order to determine ANI information 360. If ALI database 310 fails to provide ANI information 360 to ALI query logic 620, AERVS terminating device 420 may provide failure results (e.g., failed to retrieve ANI information 360) to AERVS originating device 410. ALI query logic 620 may provide ANI information 360 (or error information if ANI information 360 is not retrieved) to test results logic 630.

Returning to FIG. 9, one or more results the E911 test call may be sent (block 950), and a callback may be performed based on callback information (block 960). For example, in implementations described above in connection with FIG. 6, test results logic 630 of AERVS terminating device 420 may receive ANI information 360 (or error information if ANI information 360 is not retrieved) from ALI query logic 620, may compile ANI information 360, and may send test results 440 to AERVS originating device 410. Callback test logic 640 of AERVS terminating device 420 may place callback 450 to a callback number provided during simulated E911 call 320. If AERVS originating device 410 fails to receive callback 450, callback test logic 640 may disconnect callback 450 and may send callback error information to AERVS originating device 410.

Figure 10:
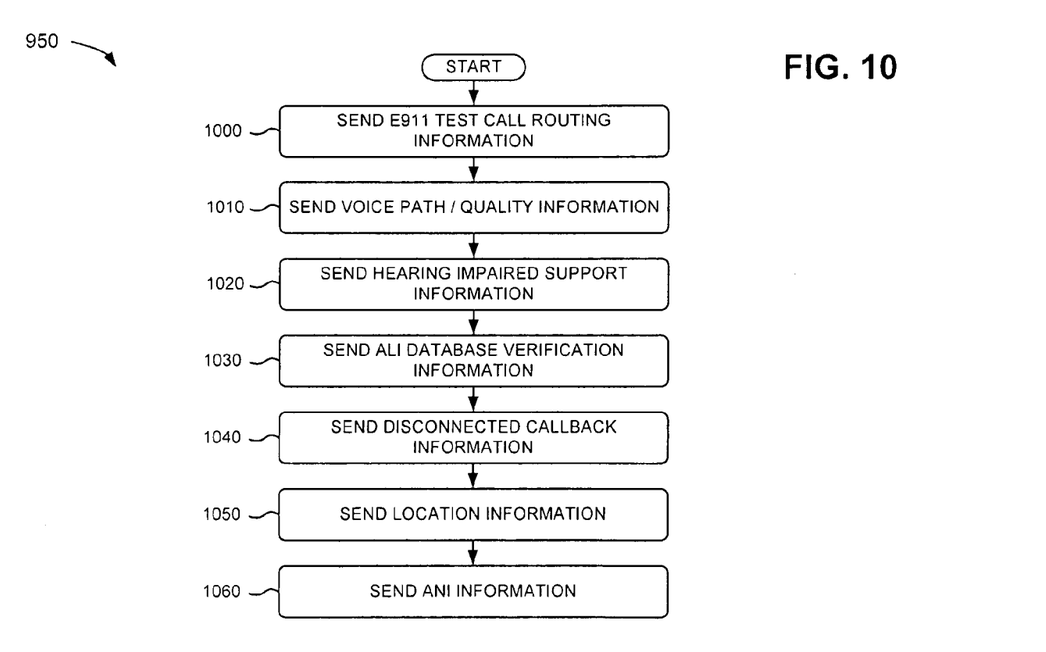

Process block 950 may include the process blocks illustrated in FIG. 10. As shown in FIG. 10, process block 950 may include one or more of sending E911 test call routing information (block 1000), sending voice path and/or voice quality information (block 1010), sending hearing impaired support information (block 1020), sending ALI database verification information (block 1030), sending disconnected callback information (block 1040), sending location information (block 1050), and/or sending ANI information (block 1060). For example, in implementations described above in connection with FIG. 4, AERVS terminating device 420 may send test results 440 AERVS originating device 410. Test results 440 may include any of the failure results discussed above, the compiled ANI information 360, and information associated with a variety of tests (e.g., whether simulated E911 call 320 routes to a correct PSAP based on test ANI 330; a voice path and/or voice quality of simulated E911 call 320; whether hearing impaired support (i.e., TTY, instant messaging, video sign language, etc.) is provided for simulated E911 call 320; whether ANI information 360 is accurate; whether a callback number (e.g., to AERVS originating device 410) may be reached; whether a location for mobile users may be identified; etc.).

Implementations described herein may include systems and/or methods that automatically test, verify, and/or validate E911 call scenarios by originating the E911 call, answering the E911 call, identifying a location associated with the E911 call, and/or performing a callback function. For example, in one implementation, the systems and/or methods may simulate an E911 test call based on an ANI to be tested, may generate a test notification, and may automatically initiate the E911 test call. The systems and/or methods may query an ALI database based on the ANI associated with the E911 test call, and may retrieve ANI information from the ALI database based on the query. The systems and/or methods may generate a call information report based on the ANI information and the other E911 test results, may validate callback connectivity, and may append callback validation information to the call information report.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-10, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
generating, by a first computer device, a test notification associated with an emergency services test call for an automatic number identification (ANI) to be tested;
sending, by the first computer device, the test notification to a second computer device,
the test notification including information identifying the ANI;
initiating, by the first computer device and after sending the test notification, the emergency services test call;
determining, by the second computer device, results associated with the emergency services test call,
determining the results associated with the emergency services test call including:
identifying the emergency services test call from a plurality of emergency services calls based on the test notification,
querying, based on the information identifying the ANI, automatic location identification (ALI) records to retrieve ANI information,
the ANI information identifying a particular Public Safety Answering Point (PSAP) associated with the ANI when the emergency services test call is initiated, and
determining, based on the ANI information, results of the emergency services test call,
the results including an indication of whether the particular PSAP received the emergency services test call;
receiving, by the first computer device and from the second computer device, the results associated with the emergency services test call; and
generating, by the first computer device, an emergency services call information report based on the results associated with the emergency services test call.

2. The method of claim 1, further comprising:
providing the emergency services call information report to a third computer device.

3. The method of claim 1, further comprising:
receiving a callback call based on the emergency services test call;
validating callback connectivity based on the callback call to form callback validation information; and
appending the callback validation information to the emergency services call information report.

4. The method of claim 1, where generating the emergency services call information report includes:
incorporating, in the emergency services call information report, at least one of:
call routing information associated with the emergency services test call,
voice path or voice quality information associated with the emergency services test call,
hearing impaired support information associated with the emergency services test call,
ALI verification information associated with the emergency services test call,
disconnected callback information associated with the emergency services test call,
location information associated with the emergency services test call, or
the ANI information associated with the emergency services test call.

5. A method comprising:
receiving, by a processor, a test notification associated with an emergency services test call,
the emergency services test call being associated with an automatic number identification (ANI) to be tested, and
the test notification including information identifying the ANI;
receiving, by the processor, the emergency services test call based on the test notification;
querying, by the processor and based on the information identifying the ANI included in the test notification, automatic location identification (ALI) records to retrieve ANI information,
the ANI information identifying a particular Public Safety Answering Point (PSAP) associated with the ANI when the emergency services test call is initiated;
determining, by the processor and based on the ANI information, results of the emergency services test call,
the results including an indication of whether the particular PSAP received the emergency services test call; and
sending, by the processor, the results of the emergency services test call to another device.

6. The method of claim 5, further comprising:
generating a callback call, to the other device, based on the emergency services test call.

7. The method of claim 5, where determining the results of the emergency services test call comprises:
determining data associated with at least one of:
call routing information associated with the emergency services test call,
voice path or voice quality information associated with the emergency services test call,
hearing impaired support information associated with the emergency services test call,
ALI records verification information associated with the emergency services test call,
disconnected callback information associated with the emergency services test call,
location information associated with the emergency services test call, or
the ANI information associated with the emergency services test call; and
determining the results further based on the data.

8. A device comprising:
one or more processors to:
generate a test notification associated with an emergency services test call for an automatic number identification (ANI) to be tested,
send the test notification to another device,
initiate the emergency services test call within a network supporting emergency services,
the other device being to:
identify the emergency services test call based on the test notification,
query, based on the ANI, automatic location identification (ALI) records to retrieve ANI information,
the ANI information identifying a particular Public Safety Answering Point (PSAP) associated with the ANI when the emergency services test call is initiated, and
determine, based on the ANI information, results of the emergency services test call,
the results including an indication of whether the particular PSAP received the emergency services test call, receive, from the other device, the results of the emergency services test call, and
generate an emergency services call information report based on the results of the emergency services test call.

9. The device of claim 8, where the emergency services comprise enhanced 911 (E911) services, and the emergency services test call is an E911 services call.

10. The device of claim 8, where the network comprises a data network that supports voice over Internet Protocol (VoIP) communications, and
where the one or more processors send the test notification to the other device via the data network.

11. The device of claim 8, where the test notification further includes temporal information associated with the emergency services test call.

12. The device of claim 8, where the one or more processors are further to:
provide the emergency services call information report for display.

13. The device of claim 8, where the one or more processors are further to:
receive a callback call based on the emergency services test call,
validate callback connectivity based on the callback call to obtain callback validation information, and
append the callback validation information to the emergency services call information report.

14. The device of claim 8, where the one or more processors, when generating the emergency services call information report, are further to include, in the emergency services call information report, data associated with at least one of:
call routing information associated with the emergency services test call,
voice path or voice quality information associated with the emergency services test call,
hearing impaired support information associated with the emergency services test call,
ALI verification information associated with the emergency services test call,
disconnected callback information associated with the emergency services test call,
location information associated with the emergency services test call, or
the ANI information associated with the emergency services test call.

15. A system comprising:
a first processor to:
initiate an emergency services test call, within a network supporting emergency services, based on an automatic number identification (ANI) to be tested, and
generate a test notification associated with the emergency services test call; and
a second processor to:
receive the test notification associated with the emergency services test call,
identify, based on the test notification, the emergency services test call,
execute a query on automatic location identification (ALI) records, based on the ANI to retrieve ANI information from the ALI records,
the ANI information identifying a particular Public Safety Answering Point (PSAP) associated with the ANI when the emergency services test call is initiated,
determine, based on the ANI information, results of the emergency services test call,
the results including an indication of whether the particular PSAP received the emergency services test call, and
send the results of the emergency services test call to the first processor.

16. The system of claim 15, where the first processor is further to:
receive the results of the emergency services test call from the second processor; and
generate an emergency services call information report based on the results of the emergency services test call.

17. The system of claim 16, where the first processor is further to:
forward the emergency services call information report to a user device.

18. The system of claim 16, where the second processor is further to:
generate a callback call based on the emergency services test call; and
where the first processor is further to:
receive information associated with the callback call,
validate callback connectivity based on the information associated with the callback call to form callback validation information, and
append the callback validation information to the emergency services call information report.

19. The system of claim 16, where the first processor is further to:
receive data that includes at least one of:
call routing information associated with the emergency services test call,
voice path or voice quality information associated with the emergency services test call,
hearing impaired support information associated with the emergency services test call,
ALI memory verification information associated with the emergency services test call,
disconnected callback information associated with the emergency services test call,
location information associated with the emergency services test call, or
the ANI information associated with the emergency services test call, and
generate the emergency services call information report further based on the received data.

20. A non-transitory computer-readable memory device that stores instructions, the instructions comprising:
one or more instructions that, when executed by a processor, cause the processor to generate an emergency services test call based on an automatic number identification (ANI) to be tested;
one or more instructions that, when executed by the processor, cause the processor to generate a test notification associated with the emergency services test call;
one or more instructions that, when executed by the processor, cause the processor to forward, via a network supporting emergency services, the emergency services test call and the test notification to a device,
the device identifying the emergency services test call based on the test notification,
the device querying, based on the test notification, automatic location identification (ALI) records to retrieve ANI information,
the ANI information identifying a particular Public Safety Answering Point (PSAP) associated with the ANI when the emergency services test call is generated;

one or more instructions that, when executed by the processor, cause the processor to receive results of the emergency services test call from the device; and one or more instructions that, when executed by the processor, cause the processor to generate an emergency services call information report based on the results of the emergency services test call, the emergency services call information report indicating whether the emergency services test call was received at the particular PSAP.

21. The non-transitory computer-readable memory device of claim 20, where the instructions further comprise:

one or more instructions to receive a callback call based on the emergency services test call;

one or more instructions to validate callback connectivity based on the callback call to form callback validation information; and one or more instructions to append the callback validation information to the emergency services call information report.

22. The non-transitory computer-readable memory device of claim 20, where the instructions further comprise:

one or more instructions to receive data associated with one or more of:

call routing information associated with the emergency services test call, voice path or voice quality information associated with the emergency services test call, hearing impaired support information associated with the emergency services test call, automatic location identification (ALI) verification information associated with the emergency services test call;

disconnected callback information associated with the emergency services test call, location information associated with the emergency services test call, or the ANI information associated with the emergency services test call; and one or more instructions to include the data in the emergency services call information report.

* * * * *